United States Patent [19]
Guy

[11] Patent Number: 5,490,935
[45] Date of Patent: Feb. 13, 1996

[54] METHOD FOR TREATING WASTEWATER

[76] Inventor: Monroe W. Guy, 3924 Lake Sherwood Ave. E., Baton Rouge, La. 70816

[21] Appl. No.: 180,122
[22] Filed: Jan. 11, 1994
[51] Int. Cl.$^6$ .................................................. C02F 3/02
[52] U.S. Cl. ........................ 210/620; 210/758; 210/195.3
[58] Field of Search ............................. 210/195.3, 221.2, 210/525, 614, 620, 629, 758

[56] References Cited

U.S. PATENT DOCUMENTS

| | | | |
|---|---|---|---|
| 4,650,577 | 3/1987 | Hansel | 210/195.3 |
| 4,983,285 | 1/1991 | Nolen | 210/197 |
| 5,221,470 | 6/1993 | McKinney | 210/151 |

Primary Examiner—Thomas S. Wyse
Attorney, Agent, or Firm—Roy, Kiesel & Tucker

[57] ABSTRACT

An apparatus and method for treating wastewater is provided including a cylindrical tank having a sidewall, a bottom, an upper portion and a lower portion; a hopper positioned within the tank, the hopper having sides, an upper opening located in the upper portion at a point above a desired water level within the tank and a lower opening located in the lower portion of the tank, the hopper sides diverging from the lower opening to the upper opening, the lower opening being smaller than the upper opening; a compressed air source; at least five radially spaced air outlet pipes, each air outlet pipe being fluidly connected to the compressed air source and extending downward into the lower portion of the tank and having an open end positioned above the bottom between the hopper and the sidewall of the tank so as to discharge air into an aeration zone between the hopper and the tank sidewall; an inlet line connected to the tank and having a discharge end opening into the tank between the hopper and the tank sides; and an outlet line having an inlet end positioned within the hopper in the upper portion of the tank and an outlet end exterior of the tank, whereby the wastewater within the tank is continuously aerated through the air outlet pipes with a sufficient volume of air and sufficiently large bubbles such that the wastewater is continuously agitated within the tank exterior of the hopper so as to eliminate any quiescent zones in the upper portion of the tank.

7 Claims, 2 Drawing Sheets

METHOD FOR TREATING WASTEWATER

BACKGROUND OF THE INVENTION

1. Field of the Invention

This invention relates generally to apparatus and methods for treatment of wastewater and, more particularly, to apparatus and methods for aerobic treatment wastewater in a single tank employing an inverted cone clarifier.

2. Prior Art

Relatively small, self-contained wastewater treatment systems are being employed throughout the country for treatment of wastewater from domestic sources, particularly single family dwellings located in areas which are not sewed by a larger municipal collection and treatment system. Strict federal and state clean water standards have resulted in a proliferation of various units designed to produce an effluent which meets those standards. Most states require stringent testing of treatment systems proposed for sale. A relatively small number of small volume aerobic treatment systems have been approved for sale due to the inability to meet the required effluent standards. By far the most popular and accepted test standard is NSF Standard 40 for Individual Aerobic Wastewater Treatment Plants (revised in June of 1990), known as "NSF Standard 40", as developed by the NSF Joint Committee on Wastewater Technology. Proposed units are tested by NSF International at the NSF test facility in Chelsea, Mich.

One popular treatment system design employs a single cylindrical tank having an inverted cone clarifier positioned within the tank with four radially spaced air pipes delivering air into the tank outside of the clarifier, as illustrated in U.S. Pat. No. 4,650,577, invented by Mr. Bradley L. Hansel (hereafter referred to as the "inverted cone system"). The geometry of the inverted cone system has proven to be a cost effective and efficient way to treat domestic sewage. However, even these units and variations on the inverted cone system have had some difficulty meeting NSF Standard 40.

Prior art treatment units similar to the inverted cone system have attempted to improve performance by raising the dissolved oxygen content of the wastewater within the tank, thus providing additional support for the aerobic bacteria which feed on the waste. An example of such an attempt can be seen in U.S. Pat. No. 5,221,470, invented by Mr. Jerry L. McKinney. In this system, two air pipes deliver air to the lower portion of the tank and terminate at diffusers, which produce fine bubbles to maximize oxygen transfer to the wastewater. Such systems concentrate on oxygen transfer as opposed to mixing, leaving quiescent zones between air outlet pipes. However, an additional filter was required to attain proper treatment.

A modification of the inverted cone system was thus desirable to maintain the basic geometry of the system while increasing treatment efficiency.

SUMMARY OF THE INVENTION

Considering the above, it is an object of this invention to provide increased treatment efficiency in an inverted cone wastewater treatment system.

It is another object of this invention to provide increased treatment efficiency in an inverted cone system without the addition of one or more filters to the system.

It is yet another object of this invention to provide increase treatment efficiency in an inverted cone system while minimizing cost increases associated with the increased efficiency.

Accordingly, an apparatus and method for treating wastewater is provided including a cylindrical tank having a sidewall, a bottom, an upper portion and a lower portion; a hopper positioned within the tank, the hopper having sides, an upper opening located in the upper portion of the tank at a point above a desired water level within the tank and a lower opening located in the lower portion of the tank, the hopper sides diverging from the lower opening to the upper opening, the lower opening being smaller than the upper opening; a compressed air source; at least five radially spaced air outlet pipes, each air outlet pipe being fluidly connected to the compressed air source and extending downward into the lower portion of the tank and having an open end positioned above the bottom between the hopper and the sidewall of the tank so as to discharge air into an aeration zone between the hopper and the tank sidewall; an inlet line connected to the tank and having a discharge end opening into the tank between the hopper and the tank sides; and an outlet line having an inlet end positioned within the hopper in the upper portion of the tank and an outlet end exterior of the tank, whereby the wastewater within the tank is continuously aerated through the air outlet pipes with a sufficient volume of air and sufficiently large bubbles such that the wastewater is continuously agitated within the tank exterior of the hopper so as to eliminate any quiescent zones in the aeration zone. A radial spacing between outlet pipes of less than fifty inches, measured along the sidewall of the tank, is preferred. Further, the air flow and size of the bubbles emitted from the air outlet pipes are designed to maximize mixing as opposed to oxygen transfer.

DETAILED DESCRIPTION OF PREFERRED EMBODIMENTS OF THE INVENTION

Figure 1:
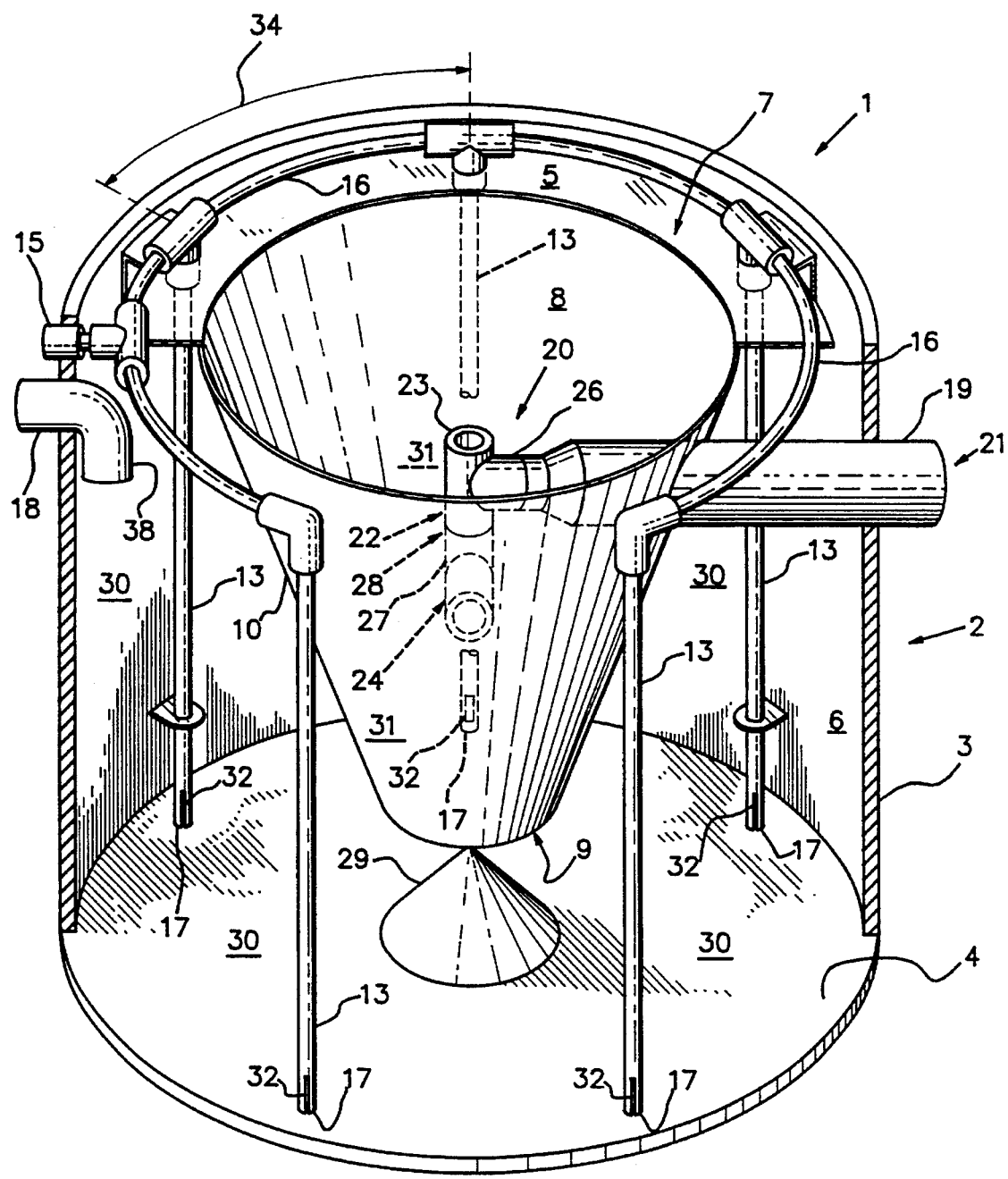
FIG. 1 is a sectional perspective view of an embodiment of the apparatus of the invention.
Figure 2:
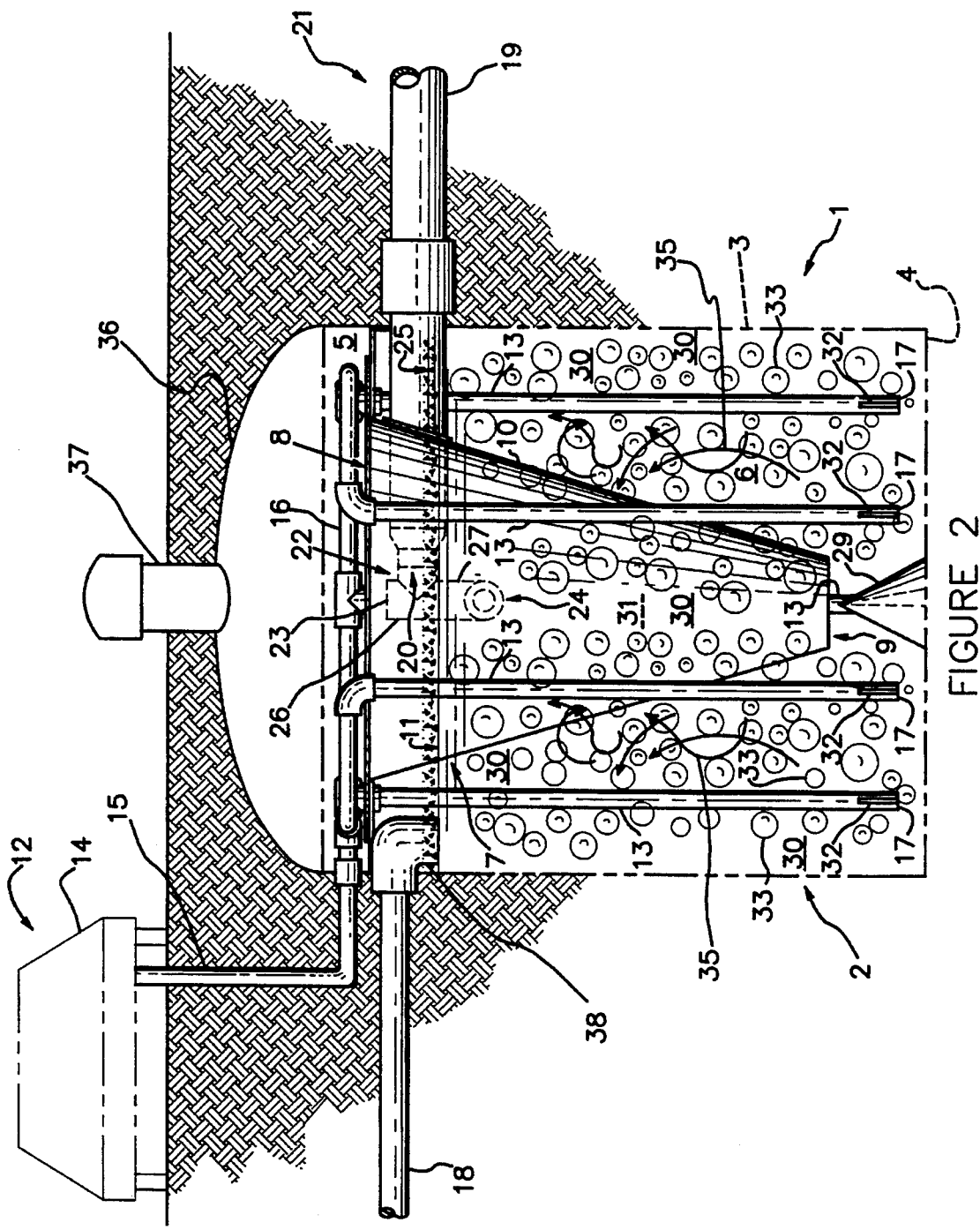
FIG. 2 is a side view of an embodiment of the apparatus of the invention installed in the ground, with its exterior removed for clarity.

As shown in the Figures, the treatment system 1 includes a cylindrical tank 2 having a continuous sidewall 3, a bottom 4, an upper portion 5 and a lower portion 6. Positioned inside tank 2 is a hopper 7 having an upper opening 8, a lower opening 9 and sides 10 diverging from lower opening 9 to upper opening 8, with upper opening 8 being larger than lower opening 9. Upper opening 8 is located in upper portion 5 above a desired water level 11 in tank 2. A scum blanket 25 of accumulated floatable material floats above water level 11. Lower opening 9 is positioned in lower portion 6 above bottom 4. A deflector 29 may be located on bottom 4 below lower opening 9, as shown. Hopper sides 10 are shown as continuous and conical, but may include other shapes such as a pyramidal shape. A compressed air source 12, such as air compressor 14, is preferably located exterior of tank 2, and is fluidly connected to a plurality of radially spaced air outlet pipes 13. As shown in FIG. 2, compressor 14 is connected to air outlet pipes 13 by compressor discharge line 15, which is connected to air outlet pipes 13 by header pipe 16. Each air outlet pipe 13 extends downward into lower portion 6 of tank 2 and has an open end 17 positioned above bottom 4 between hopper 7 and sidewall 3. A top 36 is provided to cover tank 2. Sufficient space above scum blanket 25 should be allowed for some freeboard above normal scum buildup. It may be desirable to provide a sealed connection between top 36 and tank 2, allowing a slight pressure buildup in tank 2. An access opening 37 is provided in top 36.

An inlet line 18 is connected to tank 2 as shown, providing wastewater to the system 1, through discharge end 38, between hopper 7 and tank sidewall 3. An outlet line 19 is provided, having an inlet end 20 positioned within hopper 7 in upper portion 5 of tank 2, and an outlet end 21 exterior of tank 2. A vertical pipe 22 is connected to inlet end 20. Typically, vertical pipe 22 is included in a tee connected to inlet end 20. Vertical pipe 22 has an open upper end 23 extending above scum blanket 25 to prevent siphoning, and a submerged end 24 extending below water level 11 to prevent scum blanket particles from being discharged from the system 1. Preferably, pipe 22 is constructed using a first tee 26 connected to inlet end 20 and a second tee 27 connected to the lower end 28 of first tee 26. Outlet line 19 provides an exit for clarified wastewater from the system 1.

In operation, a wastewater line, such as a sewage discharge line from a residential dwelling, is connected to inlet line 18 allowing wastewater to fill tank 2 to water level 11. Compressor 14 is continuously operated so as to discharge air from air outlet pipes 13, continuously aerating and mixing the wastewater between hopper 7 and sidewall 3, creating an aeration zone 30 in which bacteria feed on waste within the wastewater. As wastewater flows through the system, aerated wastewater flows through lower opening 9 up into hopper 7, where solids are allowed to settle in a quiescent zone 31 and return to aeration zone 30 through lower opening 9. Clarified water exits the system through outlet line 19.

It has been discovered that mixing within aeration zone 30 is extremely important to proper treatment of wastewater. Prior art emphasis on increased oxygen transfer using diffusers connected to open ends 17 of air outlet pipes 13 de-emphasized mixing together with a trend toward using less air outlet pipes 13. Due to the increased emphasis of the invention 1 on mixing, additional air outlet pipes 13 were provided in the system 1. Additionally, diffusion of air discharged from outlet pipes 13 was discouraged by using open ends 17. Open ends 17 discharge coarse bubbles 33 which rise and displace large volumes of wastewater resulting in increased turbulence within aeration zone 30, as shown by arrows 35. Slots 32 may be used to provide some dispersement of air. However, the primary air flow should be through open ends 17. At least five radially spaced outlet pipes 13 should be used, having a spacing of no greater than fifty inches, measured circumferentially along sidewall 3, as shown by dimension arrow 34. Wastewater should be continuously aerated by substantially continuous flow of air through air outlet pipes 13 in the form of coarse bubbles 33 so as to eliminate any quiescent, or non-turbulent, zones in aeration zone 30.

It is believed that an additional benefit of the system 1 has been discovered. By using large bubble agitation as discussed above, dissolved oxygen levels within aeration zone 30 are lower than previously thought permissible. However, a dramatic increase in treatment efficiency has been observed. It is believed that aerobic bacteria which thrive at lower dissolved oxygen levels, such as filamentous bacteria, are providing increased treatment efficiency. Filamentous bacteria are normally thought to be undesirable due to long tentacles, or filaments, which tend to cause the bacteria to clump together. However, filamentous bacteria provide excellent wastewater treatment. By using continuous large bubble aeration with an increased number of air outlet pipes 13, as explained above, it appears that there is sufficient agitation to maintain a uniform mix of filamentous bacteria. It is believed that the proliferation of filamentous bacteria is providing an added filtering effect while efficiently treating the wastewater. Thus, in order to encourage such efficient treatment, it is preferred that the size of bubbles 33 be sufficiently large to maintain a maximum average dissolved oxygen level within the aeration zone 30 of less than two milligrams per liter of wastewater, when measured daily over a twenty-eight week period. As the temperature of the wastewater within the tank 2 decreases, the dissolved oxygen content rises. However, once the filamentous bacteria are established and maintained during the warmer months, they appear to survive the higher oxygen content of the colder months. Thus, it is also preferable that the size of bubbles 33 be sufficiently large to maintain a maximum average dissolved oxygen level within the aeration zone 30 of less than one milligram per liter of wastewater, when measured daily during a thirty day period when the wastewater in tank 2 has an average daily temperature greater than fifteen degrees Centigrade.

A prototypical system 1 was tested to determine whether or not the system 1 would meet NSF Standard 40 . The system 1 included a tank 2 having a diameter of 5'-6", with a water level 11 at a height of 4'-4" from bottom 4. Upper opening 8 of hopper 7 had an internal diameter of 4'-10", and lower opening 9 had an internal diameter of 12. Hopper 7 had a vertical height of 4'-1½". Air outlet pipes 13 were ¾"Sch. 40 PVC pipes with open ends 17 positioned 2" above bottom 4 and were spaced approximately 42" apart, measured along the tank sidewall 3. Compressor 14 had an output of 1.88 cfm at 2 psi. The system 1 had a daily capacity of 400 gallons/day. The system 1 was subjected to the testing standards of NSF Standard 40 . Dissolved oxygen levels were maintained below the thresholds described above by continuous aeration through air outlet pipes 13. The 7-day average for effluent $BOD_5$ ranged from <5 to 14 mg/L, the 30-day averages ranged from 5 to 8 mg/L and the percent removal ranged from 95 to 98 percent, easily meeting the requirements of NSF Standard 40 for effluent $BOD_5$. The 7-day average suspended solids ranged from 5 to 14 mg/L, the 30-day averages ranged from 6 to 8 mg/L and the percent reduction ranged from 96 to 97 percent, again easily meeting the requirements of NSF Standard 40 for effluent suspended solids.

As can be seen, an apparatus and method for treating wastewater are provided which result in dramatic treatment efficiency. Other embodiments of the invention will occur to those skilled in the art, and are intended to be included within the scope and spirit of the following claims.

I claim:

1. A method for treating wastewater in an apparatus comprising a cylindrical tank having a sidewall, a bottom, an upper portion and a lower portion; a hopper positioned within said tank, said hopper having sides, an upper opening located in said upper portion at a point above a desired water level within said tank and a lower opening located in said lower portion of said tank, said hopper sides diverging from said lower opening to said upper opening, said lower opening being smaller than said upper opening; a compressed air source; at least five radially spaced air outlet pipes, each said air outlet pipe being fluidly connected to said compressed air source and extending downward into said lower portion of said tank and having an open end positioned above said bottom between said hopper and said sidewall of said tank so as to discharge air into an aeration zone between said hopper and said tank sidewall; an inlet line connected to said tank and having a discharge end opening into said tank between said hopper and said tank sides; and an outlet line having an inlet end positioned within said hopper in said upper portion of said tank and an outlet end exterior of said tank, said method comprising:

continuously aerating wastewater within said tank through said air outlet pipes with a sufficient volume of air and sufficiently large bubbles such that said wastewater is continuously agitated within said tank exterior of said hopper so as to eliminate any quiescent zones within said aeration zone.

2. A method for treating wastewater according to claim 1, further comprising the step of releasing sufficiently large bubbles through said air outlet pipes to maintain a maximum average dissolved oxygen level within said aeration zone of less than two milligrams per liter of wastewater, measured daily over a twenty-eight week period.

3. A method for treating wastewater according to claim 1, further comprising the step of releasing sufficiently large bubbles through said air outlet pipes to maintain a maximum average dissolved oxygen level within said aeration zone of less than one milligram per liter of wastewater measured daily during a thirty day period when said wastewater in said tank has an average daily temperature greater than fifteen degrees Centigrade.

4. A method for treating wastewater according to claim 1, wherein said wastewater is flowed into said tank for treatment at a rate such that the quotient resulting from dividing the flow rate of said wastewater by the surface area of the wastewater in said hopper does not exceed about 25 gallons per day for each square foot of said surface area.

5. A method for treating wastewater according to claim 1, wherein said wastewater is flowed into said tank for treatment at a rate such that the quotient resulting from dividing the flow rate of said wastewater by the surface area of the wastewater in said hopper is about 21.8 gallons per day for each square foot of said surface area.

6. A method for treating wastewater according to claim 2, wherein said wastewater is flowed into said tank for treatment at a rate such that the quotient resulting from dividing the flow rate of said wastewater by the surface area of the wastewater in said hopper does not exceed about 25 gallons per day for each square foot of said surface area.

7. A method for treating wastewater according to claim 2, wherein said wastewater is flowed into said tank for treatment at a rate such that the quotient resulting from dividing the flow rate of said wastewater by the surface area of the wastewater in said hopper is about 21.8 gallons per day for each square foot of said surface area.

* * * * *